United States Patent [19]

Inoue

[11] Patent Number: 5,310,792
[45] Date of Patent: * May 10, 1994

[54] THERMOPLASTIC RESIN COMPOSITION AND METHOD FOR PRODUCING THE SAME

[75] Inventor: Toshio Inoue, Kawasaki, Japan

[73] Assignee: Nippon Petrochemicals Company, Limited, Tokyo, Japan

[*] Notice: The portion of the term of this patent subsequent to May 26, 2009 has been disclaimed.

[21] Appl. No.: 814,716

[22] Filed: Dec. 30, 1991

[30] Foreign Application Priority Data

Dec. 29, 1990 [JP] Japan ................. 2-417668

[51] Int. Cl.$^5$ .................. C08L 23/10; C08L 23/26
[52] U.S. Cl. .................. 525/64; 525/66; 525/67; 525/68; 525/92; 525/98; 525/123; 525/132; 525/153; 525/185; 525/193; 525/194; 525/211; 525/227; 525/232; 525/237; 525/238; 525/240; 525/328.5; 525/328.6; 525/328.9; 525/329.1; 525/329.5; 525/327.7; 525/329.9; 525/330.3; 525/330.5; 525/331.7; 525/332.5
[58] Field of Search .............. 525/66, 64, 67, 68, 525/92, 98, 123, 132, 153, 185, 193, 194, 211, 227, 232, 237, 238, 240, 328.5, 328.6, 328.9, 329.1, 329.5, 329.7, 329.9, 330.3, 330.5, 331.7, 332.5

[56] References Cited

U.S. PATENT DOCUMENTS

| | | | |
|---|---|---|---|
| 4,895,899 | 1/1990 | Wefer | 525/67 |
| 4,929,675 | 5/1990 | Abe et al. | 525/66 |
| 4,957,965 | 9/1990 | Toubitz et al. | 525/66 |
| 5,116,908 | 5/1992 | Inoue et al. | 525/194 |
| 5,159,016 | 10/1992 | Inoue et al. | 525/194 |

FOREIGN PATENT DOCUMENTS

| | | | |
|---|---|---|---|
| 62-37671 | 2/1987 | Japan | F25D 23/06 |
| 62-179546 | 6/1987 | Japan | C08L 23/26 |
| 63-53225 | 7/1988 | Japan | C22C 1/09 |
| 63-30547 | 9/1988 | Japan | C08L 23/12 |
| 2-26751 | 1/1990 | Japan | B41J 2/18 |
| 2-49065 | 2/1990 | Japan | C08L 101/00 |
| 2-381 | 5/1990 | Japan | H01L 31/04 |

Primary Examiner—John Kight, III
Assistant Examiner—John M. Cooney, Jr.
Attorney, Agent, or Firm—Scully, Scott, Murphy & Presser

[57] ABSTRACT

An improved thermoplastic resin composition obtained by subjecting a mixture of at least an engineering plastic and a rubber material containing an $\alpha,\beta$-unsaturated carboxylic acids or their derivatives, to dynamic heat treatment in the presence of a carbon radical inducing agent. The thermoplastic resin composition of the invention excels in thermal resistance, rigidity, impact resistance, and moldability.

15 Claims, No Drawings

THERMOPLASTIC RESIN COMPOSITION AND METHOD FOR PRODUCING THE SAME

BACKGROUND OF THE INVENTION (1) Field of the Invention

This invention relates to an improved thermoplastic resin composition and a method for producing the same. The thermoplastic resin composition of the invention has excellent properties and is prepared by subjecting a mixture of an engineering plastic and a rubber material containing $\alpha,\beta$-unsaturated carboxylic acids or its derivative to dynamic heat treatment in the presence of a carbon radical inducing agent.

(2) Description of Prior Art

Although the engineering plastic is light in weight, it excels in thermal resistance and rigidity. Accordingly, the utility of the engineering plastic has been widened for structural materials in place of hitherto used metals. In the field of structural materials for automobiles and for electric and electronic parts and accessories, the improvement in physical properties such as impact resistance are required. For this reason, the improvement of the material by blending several kinds of rubber-like materials having functional groups or ethylene copolymer, has been proposed. For example, proposed in Japanese Patent Publication No. Sho 62-37671 is a composition comprising polycarbonate, polyester and acrylate rubber-like copolymer. In Japanese Patent Publication No. Hei 2-381 is proposed a composition comprising polyester and epoxy-containing olefin; in Japanese Patent Publication No. Sho 63-53225, a composition comprising polyester and olefin modified with unsaturated carboxylic acids; and in Japanese Laid-Open Patent Publication No. Hei 1-203459 (corresponding to U.S. Pat. No. 4,895,899), a composition comprising polyester, polycarbonate and rubber of ethylene-propylene non-conjugated diene-copolymer grafted with styrene-acrylonitrile resin.

However, there is no proposal to improve these compositions further by utilizing the radical reaction. In the conventional art, when the compatibility of a resin must be improved by the radical reaction among various blended materials, it is carried out in the presence of a radical forming agent such as organic peroxides and azo compounds. The resins which are cross-linked by a radical forming agent such as an organic peroxide, the thermoplasticity (fluidity, etc.) is lost by cross-linking of molecules. Therefore, it was necessary to add a component which is not cross-linked by an organic peroxide in order to avoid the loss of thermoplasticity (for example, Japanese Laid-Open Patent Publication No. Sho 63-30547). The reason why the above measure has not been taken is considered that it cannot always be applied to any kind of blended resins.

As compositions which are similar to the composition of the present invention containing bismaleimide compounds are exemplified by a resin composition which is prepared by melt-kneading several thermoplastic resins with maleimide compounds having unsaturated bonds (Japanese Patent Publication No. Sho 56-18613), a resin composition which is prepared by melt kneading a polyolefin resin, another resin having carboxyl groups in molecules and maleimide compounds (Japanese Laid-Open Patent Publication No. Hei 2-269751), and a resin composition which is prepared by melt kneading a polyamide, a modified polyolefin and a maleimide compound (Japanese Patent Publication No. Sho 62-179546). It has, however, not yet been tried to improve the engineering plastic positively by using a radical forming agent.

The inventors of the present application have proposed a method to modify a thermoplastic resin using a carbon radical inducing agent which hardly causes side reaction and is different from conventional vigorous radical forming gents such as organic peroxides (Japanese Laid-Open Patent Publication No. Hei 2-49065, corres. to U.S. patent application Ser. No. 290,362).

BRIEF SUMMARY OF THE INVENTION

In view of the above-described state of the prior art, the present invention was intended to improve the engineering plastic disclosed in the above-mentioned U.S. patent application Ser. No. 290,362.

It is, therefore, the object of the present invention to provide a thermoplastic resin composition in which the impact resistance, adaptability to injection molding and other properties of an engineering plastic are improved in order to meet the functions required in the industrial fields of automobiles and electric and electronic machinery.

The inventors of the present application had carried out extensive investigations and, as a result, the present invention was accomplished.

The present invention relates to an improved thermoplastic resin composition having improved properties and a method for producing the same. The thermoplastic resin composition is prepared by subjecting a mixture of:

(A) at least one of engineering plastics and (B) a rubber material containing an $\alpha,\beta$-unsaturated carboxylic acid or its derivative to dynamic heat treatment in the presence of a carbon radical inducing agent.

DETAILED DESCRIPTION OF THE INVENTION

The present invention will be described in more detail in the following.

The material of (A) an engineering plastic herein referred to as one of main components means the one which comprises a constituent monomer having non-covalent electron pairs and which excels in thermal resistance, rigidity and oil resistance. Exemplified as the engineering plastics are modified polypropylene, ABS resin, AES resin, AAS resin, methacrylic resin, polyamide resin including thermoplastic polyamide elastomers, thermoplastic polyurethane resin including thermoplastic polyurethane elastomers, polyacetal resin, polyphenylene ether resin, modified polyphenylene ether resin, polycarbonate resin, polyester resin including thermoplastic polyester elastomers, polysulfone resin, polyether sulfone resin, polyphenylene sulfide resin, polyarylate resin, polyether ketone resin, polyether ether ketone resin, and polyamide imide resin.

These resins can be used singly or as a mixture of two or more kinds. Even though there is no limitation in the use of two or more kinds, it is preferable to use thermoplastic resins which are compatible to one another. This is for the reason that the inherent compatibility can be further improved by the effect of the present invention. Exemplified as the combinations of resins are polycarbonate with polyester resin (including thermoplastic polyester elastomers), polycarbonate with ABS resin, AES resin or AAS resin, and polyester resin (including thermoplastic polyester elastomers) with ABS resin, AES resin or AAS resin.

Other examples of the combination of two resins are as follows:

PP/PA, PP/PPO, PP/ABS, PA/PPO, PBT/PPO, ABS/PA, ABS/PBT, ABS/PPO, ABS/PC, PPO/PC, PBT/PC, PPS/PPO, PPS/PA, PS/PPO, LCP/PEs, PC/PES (including thermoplastic polyester elastomers), PC/ABS resin, AES resin or AAS resin, PES (including thermoplastic polyester elastomers)/ABS resin, AES resin or AAS resin.

In the above paragraphs, PP means polypropylene; PA, polyamide; PPO, polyphenylene oxide; PBT, polybutylene terephthalate; ABS, acrylonitrile-butadiene-styrene copolymer; AES, acrylonitrile-ethylene-propylene-diene terpolymer-styrene copolymer; AAS, acrylonitrile-acrylate-styrene copolymer; PC, polycarbonate; PPS, polyphenylene sulfide; PS, polysulfone; LCP, liquid crystal polymer; and PEs, polyester.

It is desirable to add a compatibility improving agent. The compatibility improving agent is generally a polymer having a molecular weight of more than 1000 and made from two or more kinds of monomers. This compatibility improving agent contains at least a constituent monomer which is copolymerized or graft polymerized or grafted in the presence of a radical forming agent such as peroxide compound and has affinity for a constituent monomer of a thermoplastic resin to be mixed (e.g the bisphenol A in polycarbonate and the styrene in hydrogenated styrene-butadiene-styrene block copolymer). The compatibility improving agent with which chemical reaction is caused to occur during the melt kneading with a thermoplastic resin (e.g. the amide group in a polyamide resin and the maleic anhydride in maleic modified polypropylene, or the carboxyl group in a polyester resin and the epoxy group in an ethylene-glycidyl methacrylate copolymer), can also be used. These compatibility improving agents give a desirable dispersed condition with reducing the interfacial tension by being disposed on the interfaces of mixed different thermoplastic resins during melt kneading (reactants include grafted product after reaction). Several kinds of the agents are synthesized and are commercially available, which are exemplified by styrene-butadiene-styrene block copolymer, the hydrogenated product of this copolymer (especially effective when polycarbonate resin or polyester resin is contained), maleic modified or acrylic modified product of them, maleic modified or acrylic modified polyolefin (especially effective when polyamide is contained), ethylene-glycidyl methacrylate copolymer, and ethylene-ethylacrylate copolymer (especially effective when polycarbonate resin or polyester resin is contained). Besides the above resins, there are usable compatibility improving agents such as polystyrene containing oxazoline and polystyrene containing a peroxide monomer to which an arbitrary thermoplastic resin is grafted.

The (B) a rubber material containing an $\alpha,\beta$-unsaturated carboxylic acid or its derivative used in the present invention is exemplified by (B1) thermoplastic ethylene-propylene rubber, (B2) thermoplastic butadiene rubber, and (B3) thermoplastic isoprene rubber, natural rubber, nitrile rubber and isobutylene rubber. These rubber materials can be used singly or in combination of two or more kinds. Among them, (B1) thermoplastic ethylene-propylene rubber, (B2) thermoplastic butadiene rubber and (B3) thermoplastic isoprene rubber are preferably used.

The rubber material of "(B1) thermoplastic ethylene-propylene rubber" used in the present invention means a random copolymer which is made from main components of ethylene and propylene (hereinafter referred to as "EPM"), and the random copolymer in which a third component of a diene monomer such as dicyclopentadiene or ethylidene norbornene is added to the above copolymer (hereinafter referred to as "EPDM").

The term "(B2) thermoplastic butadiene rubber" means a copolymer which is made of a component monomer of butadiene. It is exemplified by styrene-butadiene block copolymer (hereinafter referred to as "SBS"), its partially or totally hydrogenated derivative of styrene-butadiene-ethylene copolymer (hereinafter referred to as "SBES"), 1,2-polybutadiene (hereinafter referred to as "1,2-PB"), maleic anhydride-butadiene-styrene copolymer, and a modified butadiene rubber having core shell structure.

The term "(B3) thermoplastic isoprene rubber" means a copolymer which is made of a component monomer of isoprene. It is exemplified by styrene-isoprene block copolymer (hereinafter referred to as "SIS"), its partially or totally hydrogenated derivative of styrene-isoprene-ethylene copolymer (hereinafter referred to as "SIES"), and modified isoprene rubber having core shell structure.

The term "contain" herein referred to means that certain moieties of molecules are introduced into main chains or branched chains by random copolymerization, block copolymerization or graft polymerization. However, the characteristic properties of thermoplastic processability or thermoplasticity should be maintained.

The "$\alpha,\beta$-unsaturated carboxylic acids or their derivatives" used in the present invention are exemplified by acrylic acid, methacrylic acid, maleic acid, fumaric acid, their esters and anhydrides, and maleimide compounds. In the case of ester compounds, it is desirable to introduce epoxy group, hydroxyl group (e.g. using a polyhydric alcohol) and amino group (e.g. using an amino alcohol) through esterification. Among them, maleic anhydride and glycidyl methacrylate are desirable. Furthermore, it is possible to use the copolymer of $\alpha,\beta$-unsaturated carboxylic acid anhydride. For example, ethylene-maleic anhydride copolymer and styrene-maleic anhydride copolymer can be used. Preferable maleimide compounds are exemplified by maleimide, N-substituted maleimide (e.g. N-methylmaleimide, N-ethylmaleimide, N-ter-butylmaleimide, N-cyclohexylmaleimide, N-decylmaleimide, N-phenylmaleimide, N-phenyl-$\alpha$-methylmaleimide, N-phenyl-$\alpha,\beta$-dimethylmaleimide, N-phenyl-$\alpha$-ethylmaleimide, N-phenyl-$\alpha,\beta$-diethylmaleimide, N-(4-carboxyphenyl)maleimide, N-(4-hydroxyphenyl)maleimide, and N-($\alpha$-chlorophenyl)maleimide), and bismaleimide (e.g. N,N'-m-phenylene bismaleimide, N,N'-p-phenylene bismaleimide and N,N'-ethylene bismaleimide).

By adding these compounds to the specific rubber component described below, the compatibility with the engineering plastic can be improved.

For a similar purpose, a cyano-type vinyl monomer such as acrylonitrile and methacrylonitrile can be used. Furthermore, a copolymer of the cyano-type vinyl monomer such as acrylonitrile-styrene copolymer, can also be used.

In the present invention, when a flexible engineering plastic of polyamide resin such as nylon-11, nylon-610 or nylon-12 having 8 or more methylene groups between amide bonds, or polyester-polyether block copolymer is used, and a mineral oil or a synthetic oil is added at need, a thermoplastic elastomer can be obtained because the cross-linked portions of the resin take on the property (strain resistance, flexibility, low temperature flexibility) of an elastomer. The elastomer having such characteristics is prepared generally by using a block copolymer having both hard segments and soft segments. However, elastomers having various characteristics can easily be prepared by utilizing the measure according to the present invention.

The compounding ratios of an engineering plastic and a rubber material are in the ranges of 98 to 60 wt. %, preferably 95 to 65 wt. % of the engineering plastic and 2 to 40 wt. %, preferably 5 to 35 wt. % of the rubber material. When the rubber material is less than 2 wt. %, the effect to improve impact resistance and flexibility is insufficient. On the other hand, when it is more than 40 wt. %, the rigidity is low and the balance among thermal resistance, flexibility and tensile strength is lost.

The ability of a carbon radical to abstract a hydrogen atom from an ordinary carbon-hydrogen bond is weak as compared with that of an oxygen radical which is formed by the cleavage of an organic peroxide. That is, the radical reaction proceeds around allyl positions of the polymerizing portion of diene monomer in a composition because the hydrogen abstraction is mainly caused to occur on allyl positions. Even though the reaction rate is low, the hydrogen abstraction also caused to proceed in the rubber having tertiary carbon. The cause of this is not clear, however, it is considered that the bonding force between molecules in the non-crystalline region is weak and the hydrogen abstraction by the carbon radical is caused to occur. Accordingly, the following improving effects are brought about in the composition of the present invention:

(1) The improvement in impact resistance, thermal resistance and solvent resistance owing to the partial cross-linking of polymerizing portion of diene monomer and the periphery of tertiary carbon atoms in specific non-crystalline rubber regions, and (2) The improvement in compatibility and the formation of graft polymer by the radical association of an engineering plastic as a side reaction between the polymerizing portion of diene monomer and the periphery of tertiary carbon atoms in specific non-crystalline rubber regions.

Therefore, it is possible to obtain a material in which the impact resistance is much improved. By the way, the present invention is not limited to the improvement on the basis of the above reactions.

Furthermore, the workability and mechanical properties are not impaired seriously because the chemical structure is not largely changed except the polymerizing portion of diene monomer and the partially cross-linking portions in the periphery of tertiary carbon atoms in the non-crystalline regions of the composition.

In the practical working of the present invention, the effect of the invention is produced by the fact that a compound having a carbon-carbon unsaturated bond joins itself mainly to a coexisting engineering plastic, a compound having two or more carbon-carbon unsaturated bonds joins itself mainly to a coexisting engineering plastic or it cross-links the engineering plastic, and the engineering plastic joins itself to or cross-links another coexisting engineering plastic. Accordingly, when the $\alpha,\beta$-unsaturated carboxylic acid is added to the thermoplastic ethylene propylene rubber, thermoplastic butadiene rubber or thermoplastic isoprene rubber, the addition reaction can be carried out separately from the preparation of the rubber material, or it can be carried out simultaneously by melt kneading a mixture of an unmodified rubber material, a compound for modifying the rubber and an appropriate engineering plastic.

The cross-linked specific rubber material in the present invention has a function as a nucleating agent to improve the rate of crystallization. Therefore, it is quite effective in improving polyester resin which has problems in the rate of crystallization and impact resistance. In other words, because the rate of crystallization in the injection molding of crystalline thermoplastic polyester resin is generally small, the orientation of molecules is accelerated by (1) adding seeds (nucleating agent) so as to facilitate the crystallization and (2) by adding plasticizing material in order to activate the motion among polyester molecules (to lower the glass transition temperature). However, there are remaining problems caused by worse dispersion of these additives in the unevenness of composition, occurrence of bleeding and lowering of the molecular weight of PET. Meanwhile, as the measures to improve the impact strength, there are known (1) the use of high molecular weight PET, (2) the modification of PET by copolymerization with a soft component, and (3) the blending of soft and elastic material. However, the thermal resistance is often lost in such a case. The measure to solve simultaneously the above two points of the rate of crystallization and the impact resistance, has not yet been known.

The "carbon radical inducing agent" referred to in the present invention means a combination of compounds which react mutually with a specific compound and both become carbon radicals (hereinafter referred to as "carbon radical inducing agent (I)") and a compound which forms carbon radicals spontaneously by thermal decomposition (hereinafter referred to as "carbon radical inducing agent (II)").

There are two kinds of the carbon radical inducing agents (I). These will be described in the following.

One carbon radical inducing agent (I) is a combination of compounds which form charge-transfer complexes. For example, a hydrogen atom is transferred from one compound to another compound in the complex to yield radicals on both the unsaturated bonds. As the combination of compounds used for this purpose are those having different e-values of electron densities in unsaturated bonds in both compounds and various combinations are known as alternative copolymers. Among them, it is desirable to use the compounds having larger e-values in view of the reactivity after the formation of radicals, which compounds are exemplified by maleimide, N-substituted maleimide (e.g. N-methylmaleimide, N-ethylmaleimide, N-ter-butylmaleimide, N-cyclohexylmaleimide, N-decylmaleimide, N-phenylmaleimide, N-phenyl-$\alpha$-methylmaleimide, N-phenyl-$\alpha,\beta$-dimethylmaleimide, N-phenyl-$\alpha$-ethylmaleimide, N-phenyl-$\alpha,\beta$-diethylmaleimide, N-(4-carboxyphenyl)maleimide, N-(4-hydroxyphenyl)maleimide, and N-($\alpha$-chlorophenyl)maleimide), and bismaleimide (e.g. N,N'-m-phenylene bismaleimide, N,N'-p-phenylene bismaleimide and N,N'-ethylene bismaleimide), $\alpha,\beta$-unsaturated carboxylic acid and its anhydride (e.g. acrylic acid and methacrylic acid or their esters, and maleic anhydride or its derivative).

As the compounds which form charge-transfer complexes with these compounds are exemplified by 6-ethoxy-2,2,4-trimethyl-1,2-dihydroquinoline, poly(2,2,4-trimethyl-1,2-dihydroquinoline), styrene, α-methylstyrene, transstilbene, vinylferrocene, 4-vinylpyridine, 2-isopropenylnaphthalene, N-vinylcarbazole, N-vinylindole, indole, benzofuran, furan, dihydrofuran, 3,4-dihydro-2-pyran, cyclic vinyl ethers such as 4H-chromene, furan derivatives such as furfuryl acetate, alkylvinyl ether such as n-octadecylvinyl ether and ethylvinyl ether, enol ether or enol ester of carbonyl compounds of ketone, ester, lactone, aldehyde, amide and lactam such as ketene acetal, isopropenyl acetate, and 1-amino-1-methoxyethylene, allyl acetate, vinyl acetate, 1,2-dimethoxyethylene, p-dioxene, 2-chloroethylvinyl ether, 2-phenylvinylalkyl ether, 2-phenylalkenyl ether, heptafluoroisopropylalkenyl ether, ethylvinyl sulfide, styrylalkenyl thioether, p-oxadiene, cyclopentene, cyclohexene, divinyl ether, butadiene, isoprene, 1,3-pentadiene, 1,4-pentadiene, and dimethyldivinyl silane.

In the present invention, because it is desirable that the above complexes do not form a copolymer but they dissociate as radicals, the reactivity of both radicals (which can be judged by Q-values of monomers) are much different. Among them, the combinations of dihydroquinoline derivatives such as 6-ethoxy-2,2,4-trimethyl-1,2-dihydroquinoline and poly(2,2,4-trimethyl-1,2-dihydroquinoline) or their polymers with the above maleimide compounds or unsaturated carboxylic acid anhydride, are desirable. In other words, the former is "an unsaturated compound having a relatively large e-value and a small Q-value" and the latter is "an unsaturated compound having a relatively small e-value and a large Q-value", so that the balance of e-values and Q-values is good. Furthermore, both compounds exert high activity for the reason that they have a structure in which tension is applied in the unsaturated bond portions. Judging from the effect of the present invention, when a derivative of dihydroquinoline or its polymer is added singly, it is considered that the compound forms a charge-transfer complex directly with the unsaturated bond portion of a thermoplastic resin. Furthermore, the compound is desirable also in view of the fact that it is easily available and the unreacted remainder portion acts as an age resistor.

Another group of the carbon radical inducing agents (I) is the combinations of hydrogen donating compounds and hydrogen accepting compounds. Hydrogen atoms are transferred from the former ones to the latter ones to form radicals. The hydrogen donating compound itself after the transfer of hydrogen radical can be in a stable state by resonance. It is defined that, when a certain quantity of a compound is reacted with a hydrogen acceptor of anthracene without any catalyst at 350° C., 50 atm. (under $N_2$) for 30 minutes, the transfer of hydrogen from the compound to the anthracene i at least 0.1-hydrogen atom/anthracene molecule. Exemplified as such compounds are 1,2-dihydrobenzene, 1,2-dihydronaphthalene, 9,10-dihydronaphthalene, octahydrophenanthrene, octahydroanthracene, tetraline, indene, tetrahydrofuran, 2,3-dihydrobenzofuran and fluorene. Among these compounds, octahydrophenanthrene, octahydroanthracene, tetraline, indene and fluorene are preferable for the reason that they are easily available, the final product is not colored, and they have no functional group which decomposes the amide groups and ester bonds in a thermoplastic resin.

When the hydrogen accepting compound receives a hydrogen radical and it become a radical, the resonance stability is low, so that a compound generally used as a cross-linking agent for rubber with peroxide is employed. More particularly, they are exemplified by higher esters of methacrylic acid such as trimethylolpropane trimethacrylate and ethylene dimethacrylate, and polyfunctional vinyl monomers such as divinylbenzene, triallylcyanulate and diallylphthalate. In the present invention, maleimide compounds (e.g. N,N'-m-phenylene bismaleimide and N,N'-ethylene bismaleimide) and anhydrides of unsaturated carboxylic acids (e.g. maleic anhydride and its derivatives) are desirable.

The carbon radical inducing agents (II) are exemplified by 1,1,2,2-tetramethyl-1,2-diphenylethane (generally named as "dicumyl").

In the use of the carbon radical inducing agent (I), the above effect can be produced efficiently because the radicals are directly formed in the added and/or cross-linked compound and thermoplastic resins. Meanwhile, in the case of the carbon radical inducing agent (II), the efficiency is not good because the aimed reaction of the present invention is started by the action of formed carbon radicals to the unsaturated bonds of other compounds. Besides this, side reaction such as the change of the characteristics of thermoplastic resin is caused to occur. However, an effective composition can be prepared because this side reaction is very small as compared with that of the radical of organic peroxide.

As the method for inducing carbon radicals, the addition of a bismaleimide compound and simultaneous use of an activating agent are effective. The activating agents are exemplified by benzothiazole compounds and benzothiazolyl sulfonamide compounds. The activity of these compounds is generally low as compared with that of the above carbon radical inducing agents and the field of use is limited in view of odor and coloring due to the formation of sulfur radical.

These inducing agents can be used singly or in combination of two or more. Furthermore, a trace quantity of an organic peroxide or an azo compound can be used together within the object of the present invention.

The addition quantity of carbon radical inducing agent is arbitrarily selected. Proprer quantity can be determined according to the composition of thermoplastic resin components, the kind of carbon radical inducing agent, and the apparatus and conditions of melt kneading.

When the carbon radical inducing agent is added too much, the composition is colored and cost is raised. Therefore, a proper quantity of addition of the carbon radical inducing agent must be selected in view of the balance of them. The practical addition quantity of the inducing agent is generally in the range of 0.01 to 5 weight parts, preferably 0.05 to 3 weight parts, to 100 weight parts of the whole thermoplastic resin. It is desirable that an engineering plastic and rubber material are sufficiently dispersed together by melt kneading before the start of the formation of carbon radical.

In the present invention, the mixture of two or more kinds of components obtained through the above-described process is subjected to dynamic heat treatment in the presence of a carbon radical inducing agent to prepare a resin composition. A mixing device of a high shearing rate is preferably used in the dynamic heat treatment to facilitate the formation of radicals in the mixture.

In order to attain the effect of dynamic heat treatment as the object of the present invention, it is necessary that the coefficient of shrinkage of an injection molded article of heat treated composition is larger than that of an injection molded article of a composition which is melt kneaded without adding any carbon radical inducing agent. Or it is necessary that the boiling xylene insoluble matter of the former composition is increased. The increase of these values is caused by:

(1) the cross-linking of specific rubber component in the composition, and (2) the formation of graft polymer by the radical association of the engineering plastic and the specific rubber component. Several kinds of improvement effects are large when the coefficient of shrinkage of injection molded article and/or the boiling xylene insoluble matter are large.

The apparatus used for the melt kneading and dynamic heat treatment are exemplified by known devices such as open-type mixing roll, closed Banbury mixer, extruder, kneader, and twin-screw extruder. The conditions for working the present invention with the above-mentioned composition are preferably in the ranges of 150° to 350° C. in kneading temperature and 20 seconds to 20 minutes in heat treating time.

It is possible to add several additives to the composition of the present invention, which additives are exemplified by dyes, pigments, organic fillers, inorganic fillers, metallic fillers, softening agents (mineral oils and synthetic oils), flame retardants, crystallization accelerators, heat and light stabilizers, and other additives conventionally used for plastics.

The resin composition according to the present invention has various excellent properties of moldability, mechanical properties, chemical properties, electrical properties, thermal resistance, weather resistance, and adaptability to finish coating. Therefore, various kinds of plastics articles can be produced by the presently employed thermoplastic resin formation technique such as injection molding, blow molding, extrusion molding and press forming. The products made of the resin composition of the present invention are suitably used in a filed in which the high performance of engineering plastic is required, for example, electric and electronic parts such as connecters, coil bobbins and couplers; office machinery such as machine housings and key boards; automobile parts such as door handles, instrument panels, bumpers and outer panels; and other containers for foods and industrial uses.

The present invention will be described in more detail with reference to examples. It should be noted however that the present invention is by no means limited by these examples.

In the first place, the preparation of compositions, the conditions of injection molding and the methods of testing and measuring are described.

Preparation of Composition (1) An engineering plastic (hereinafter referred to as "Component A") and a specific rubber (hereinafter referred to as "Component B") were formulated in specific ratios and they were mixed in a Henschel mixer.

(2) The mixture obtained in the above step was subjected to melt kneading with a continuous twin-screw extruder (30 mm$\phi$, made by Plastic Kogaku Kenkyusho K.K.)

(3) A carbon radical inducing agent (hereinafter referred to as "Component a") was added to the above obtained mixture and they were mixed with a Henschel mixer.

(4) The dynamic heat treatment of the above obtained mixture was carried out by melt kneading with the twin-screw extruder used in the above step (2). The treating conditions were adjusted by measuring and controlling the temperature of the composition at the outlet of the extruder and the retention time in the extruder. The heat treatment conditions of the temperature of the composition and the retention time will be described later. By the way, the temperature of a composition was measured with a resin thermometer attached to the extruder used.

(5) When a mineral oil or synthetic oil (hereinafter referred to as "Component C") is added as a softening agent, it was supplied through a pipe which was connected to the extruder.

The addition quantities of additives added to Component A and Component B are represented by weight parts per 100 weight parts of Component A plus Component B (wphr).

Injection Molding Conditions

| Injection molding machine: | IS-90B |
|---|---|
| (made by Toshiba Machine Co., Ltd.) | |
| Injection pressure: | 800 to 1,000 kg/cm$^2$ |
| Barrel temperature: | 230 to 300° C. |
| Mold temperature: | 70 to 110° C. |

Test and Measuring Methods

Unless specifically noted, annealed injection molded plates were used as test pieces. Test and measuring methods are shown in the following.

| Tensile yield strength and tensile strength: | ASTM D 630 |
|---|---|
| Flexural modulaus: | ASTM D 790 |
| Izod impact resistance: | ASTM D 256 |
| Permanent set: | JIS K 6701 |

Insoluble matter in boiling xylene:

Films of 20 mm×50 mm×0.2 mm were prepared by press forming. They were put into a 120 mesh wire netting and immersed into boiling xylene for 5 hours. The weights before and after the immersion were measured and the insoluble matter in boiling xylene was calculated by the following equation.

$$\text{Insoluble matter in boiling xylene (wt. \%)} = \frac{\text{Film weight after immersion (g)}}{\text{Film weight before immersion (g)}} \times 100$$

Coefficient of shrinkage in molding:

Dumb-bell type test specimens for use in the test of tensile yield strength (ASTM D 630) were used. The value was obtained from the size after shrinkage and the size of metal mold in the direction along the flow of material in injection molding.

Mold releasing property:

This was tested as a rough estimation of injection molding characteristics. The easiness in the mold releasing was evaluated in three grades in connection with the molded articles prepared by constant injection cycle time and mold temperature.

○: Easily released by ejector pins

Δ: Some molded articles were remained in the mold, which had to be taken off manually.

X: Most of molded articles remained in the mold, which had to be taken off manually and were deformed by the hand operation.

The carbon radical inducing agents used in examples were as follows:

a1: N,N'-m-phenylene bismaleimide
a2: Poly(2,2,4-trimethyl-1,2-dihydroquinoline)
a3: 6-Ethoxy-2,2,4-trimethyl-1,2-dihydroquinoline
a4: Cyclohexene
a5: 9,10-Dihydrophenanthrene
a6: Indene
a7: Dicumyl

EXAMPLES 1 TO 3, COMPARATIVE EXAMPLE 1

Component A of nylon 6 (trademark: Toray Amilan CM1017 made by Toray Industries Inc., hereinafter referred to as "A1") and Component B of maleic modified ethylene-propylene copolymer (trademark: JSR MEP4105 made by Japan Synthetic Rubber Corp., added maleic anhydride: 0.5 wt. %, hereinafter referred to as "B1") were used.

The temperature of the compositions at the outlet of extruder was 240° C. and the retention time in the extruder was 50 seconds. The compositions are shown in Table 1 and the properties of the compositions are shown in Table 2 (A) and Table 2 (B) together with the conditions and results of subsequent Examples and Comparative Examples.

EXAMPLES 4 AND 5, COMPARATIVE EXAMPLE 2

Component A of polybutylene terephthalate resin (trademark: Toray PBT 1401-X06 made by Toray Industries Inc., hereinafter referred to as "A2") was used. The foregoing B1 was used as Component B.

The temperature of the composition at the outlet of extruder was 240° C. and the retention time in the extruder was 50 seconds.

EXAMPLES 6 AND 7, COMPARATIVE EXAMPLE 3

Maleic modified ethylene-propylene-ethylidenenorbornene copolymer was prepared as Component B. 45 g of ethylidene-propylene-norbornene copolymer (trademark: JSR EP57P made by Japan Synthetic Rubber Corp., iodine value: 15, hereinafter referred to as "D1"), 45 mg of maleic anhydride and 20 mg of poly(2,2,4-trimethyl-1,2-dihydroquinoline) were kneaded in Brabender Plastograph at 230° C. for 3 minutes at 100 rpm to obtain a maleic modified product (hereinafter referred to as "B2"). The obtained modified product was formed into a film by a press at 150° C. and the film was immersed into boiling acetone for 10 minutes to remove unreacted maleic anhydride and poly(2,2,4-trimethyl-1,2-dihydroquinoline). After that, the introduction of carbonyl group was confirmed by infrared absorption spectrum analysis.

Component A of nylon 11 (trademark: BMN 0 made by Toray Industries Inc., hereinafter referred to as "A3") and Component B of the above B2 and a mineral oil softening agent of naphthene process oil (trademark: Super Oil C made by Nippon Oil Co., Ltd., hereinafter referred to as "C") were used. The dynamic heat treatment of these materials were carried out by kneading them in Brabender Plastograph at 230° C. for 3 minutes at 100 rpm. A film was prepared by press forming at 230° C. and test specimens were made by punching the film into a predetermined shape. The test was done according to JIS K 6301.

EXAMPLE 8, COMPARATIVE EXAMPLE 4

The Component B was prepared during the melt kneading operation. That is, the above D1 and 0.4 wphr of maleic anhydride (hereinafter referred to as "MAH") were added to Component A of the above A3 and they were melt kneaded to obtain a mixture of Component A and Component B. The above C was used as a mineral oil softening agent.

The temperature of the composition at the outlet of extruder was 220° C. and the retention time in the extruder was 70 seconds.

EXAMPLES 9 AND 10, COMPARATIVE EXAMPLE 5

Component A of polybutylene terephthalate resin (phenol/tetrachloroethane 1:1, intrinsic viscosity in 30° C. solution: 1.2 dl/g, hereinafter referred to as "A4") and Component B of the foregoing B1 were used. In Example 10, the foregoing mineral oil softening agent C was used.

The temperature of the composition at the outlet of extruder was 290° C. and the retention time in the extruder was 55 seconds. The releasing property from metal mold was compared concerning the Examples and Comparative Example.

EXAMPLE 11, COMPARATIVE EXAMPLE 6

The Component B was prepared during the melt kneading operation. That is, the above A1 was used as Component A and styrene-butadiene-styrene block copolymer (trademark: JSR TR2000 made by Japan Synthetic Rubber Corp., hereinafter referred to as "D2") and Q.4 wphr of MAH were added to the A1 and melt kneading was carried out to obtain a mixture of Component A and Component B. Then the above-mentioned step (3) and subsequent step were carried out.

The temperature of the composition at the outlet of extruder was 235° C. and the retention time in the extruder was 45 seconds.

EXAMPLE 12, COMPARATIVE EXAMPLE 7

Maleic modified styrene-isoprene-styrene block copolymer was prepared as Component B. 45 g of styrene-isoprene-styrene block copolymer (trademark: Califlex TR1107 made by Shell Chemical Corp., hereinafter referred to as "D3", 45 mg of maleic anhydride and 20 mg of poly(2,2,4-trimethyl-1,2-dihydroquinoline) were kneaded in Brabender Plastograph at 160° C. for 3 minutes at 100 rpm to obtain a maleic modified product (hereinafter referred to as "B3"). The obtained modified product was formed into a film by a press at 120° C. and the film was immersed into boiling methanol for 3 minutes to remove unreacted maleic anhydride and poly(2,2,4-trimethyl-1,2-dihydroquinoline). After that, the introduction of carbonyl group was confirmed by infrared absorption spectrum analysis.

Component A of the forging A1 and Component B of the foregoing B3 and a softening agent of the foregoing C were used. The dynamic heat treatment of these materials were carried out by kneading them in Brabender Plastograph at 230° C. for 3 minutes at 100 rpm. A film was prepared by press forming at 230° C. and test specimens were made by punching the film into a predetermined shape.

EXAMPLE 13, COMPARATIVE EXAMPLE 8

Component A of modified polyphenylene ether resin (trademark: Nolyl 731 J made by Japan GE K.K., hereinafter referred to as "A5") and Component B of hydrogenated maleic modified styrene-butadiene-styrene copolymer (trademark: Kraton G FG1901X made by Shell Chemical Co., were used.

The temperature of the composition at the outlet of extruder was 280° C. and the retention time in the extruder was 50 seconds.

EXAMPLE 14, COMPARATIVE EXAMPLE 9

Component A of polycarbonate resin (trademark: Panlite L 1250 made by Teijin Kasei K.K., hereinafter referred to as "A6") and Component B of the foregoing B4 were used.

The temperature of the composition at the outlet of extruder was 280° C. and the retention time in the extruder was 50 seconds.

EXAMPLE 15, COMPARATIVE EXAMPLE 10

Component A of polyoxymethylene resin hereinafter referred to as "A7") and Component B of the foregoing B4 were used.

The temperature of the composition at the outlet of extruder was 240° C. and the retention time in the extruder was 50 seconds.

TABLE 1

| Component | A (wt. %) | B (wt. %) | a (wphr) | Softening Agent (wt. %) |
|---|---|---|---|---|
| Example 1 | A1 (80) | B1 (20) | a1 (0.2), a2 (0.3) | — |
| Example 2 | A1 (80) | B1 (20) | a1 (0.2) | — |
| Example 3 | A1 (80) | B1 (20) | a1 (0.2), a7 (0.3) | — |
| Comp. Ex. 1 | A1 (80) | B1 (20) | — | — |
| Example 4 | A2 (80) | B1 (20) | a1 (0.2), a2 (0.3) | — |
| Example 5 | A2 (80) | B1 (20) | a1 (0.2), a6 (0.4) | — |
| Comp. Ex. 2 | A2 (80) | B1 (20) | — | — |
| Example 6 | A3 (70) | B2 (30) | a1 (0.2) | C (20) |
| Example 7 | A3 (70) | B2 (30) | a1 (0.2), a3 (0.4) | C (20) |
| Comp. Ex. 3 | A3 (70) | D1 (30) | — | C (20) |
| Example 8 | A3 (70) | D1 (30) + MAH | a1 (0.2), a5 (0.3) | C (20) |
| Comp. Ex. 4 | A3 (70) | D1 (30) | — | C (20) |
| Example 9 | A4 (80) | B1 (20) | a1 (0.2), a6 (0.3) | — |
| Example 10 | A4 (80) | B1 (20) | a1 (0.2), a3 (0.3) | C (20) |
| Comp. Ex. 5 | A4 (80) | B1 (20) | — | — |
| Example 11 | A1 (80) | D2 (20) + MAH | a3 (0.3) | — |
| Comp. Ex. 6 | A1 (80) | D2 (20) + MAH | — | — |
| Example 12 | A3 (70) | B3 (30) | a1 (0.2), a2 (0.4) | C (20) |
| Comp. Ex. 7 | A3 (70) | D3 (30) | — | C (20) |
| Example 13 | A5 (80) | B4 (20) | a1 (0.2), a2 (0.3) | — |
| Comp. Ex. 8 | A5 (80) | B4 (20) | — | — |
| Example 14 | A6 (80) | B4 (20) | a1 (0.2), a2 (0.3) | — |
| Comp. Ex. 9 | A6 (80) | B4 (20) | — | — |
| Example 15 | A7 (80) | B4 (20) | a1 (0.2), a2 (0.3) | — |
| Comp. Ex. 10 | A7 (80) | B4 (20) | — | — |

TABLE 2(A)

| Test Item Unit | Tensile Yield Strength (kg/cm²) | Tensile Break Elongation (%) | Flexural Modulus (kg/cm²) | Izod Impact Strength with a Notch (kg·cm/cm) 23° C. | Izod Impact Strength with a Notch (kg·cm/cm) −10° C. |
|---|---|---|---|---|---|
| Example 1 | 435 | — | 14,300 | >66 | 14.2 |
| Example 2 | 440 | — | 14,400 | 50.0 | 10.9 |
| Example 3 | 410 | — | 13,300 | 48.3 | 7.6 |
| Comp. Ex. 1 | 440 | — | 14,900 | 30.5 | 5.6 |
| Example 4 | 440 | — | 14,000 | 48.6 | 10.5 |
| Example 5 | 440 | — | 14,900 | 39.2 | 8.4 |
| Comp. Ex. 2 | 400 | — | 14,000 | 20.2 | 4.3 |
| Example 6 | 150 | 150 | — | — | — |
| Example 7 | 150 | >200 | — | — | — |
| Comp. Ex. 3 | 160 | 90 | — | — | — |
| Example 8 | 190 | >200 | — | 45.5 | — |
| Comp. Ex. 4 | 195 | 180 | — | 30.2 | — |
| Example 9 | 480 | — | 18,500 | 6.1 | — |
| Example 10 | 220 | — | 10,000 | 8.1 | — |
| Comp. Ex. 5 | 480 | — | 19,000 | 4.5 | — |
| Example 11 | 410 | >200 | 14,000 | 45.5 | — |
| Comp. Ex. 6 | 410 | 90 | 13,900 | 19.9 | — |
| Example 12 | 120 | — | — | — | — |
| Comp. Ex. 7 | 120 | — | — | — | — |
| Example 13 | 540 | >100 | 20,500 | 25.5 | — |
| Comp. Ex. 8 | 540 | 35 | 19,900 | 9.9 | — |
| Example 14 | 495 | >200 | 21,500 | >66 | — |
| Comp. Ex. 9 | 500 | 100 | 20,900 | 39.9 | — |
| Example 15 | 495 | >200 | 22,400 | 16.0 | — |
| Comp. Ex. 10 | 490 | 50 | 22,900 | 9.9 | — |

TABLE 2(B)

| Test Item Unit | Permanent Elongation (%) | Insoluble Matter in Boiling Xylene (wt. %) | Ratio of Shrinkage | Mold Releasing Property |
|---|---|---|---|---|
| Example 1 | — | 90 | 19/1000 | — |
| Example 2 | — | 88 | 19/1000 | — |
| Example 3 | — | 92 | 19/1000 | — |
| Comp. Ex. 1 | — | 85 | 16/1000 | — |
| Example 4 | — | 91 | — | — |
| Example 5 | — | 87 | — | — |
| Comp. Ex. 2 | — | 79 | — | — |
| Example 6 | 43 | 75 | — | — |
| Example 7 | 40 | 80 | — | — |
| Comp. Ex. 3 | 51 | 59 | — | — |
| Example 8 | — | 84 | — | — |
| Comp. Ex. 4 | — | 70 | — | — |
| Example 9 | — | 77 | — | Δ |
| Example 10 | — | 65 | — | ○ |
| Comp. Ex. 5 | — | 68 | — | X |
| Example 11 | — | 90 | 18/1000 | — |
| Comp. Ex. 6 | — | 78 | 15/1000 | — |
| Example 12 | 43 | 70 | — | — |
| Comp. Ex. 7 | 54 | 52 | — | — |
| Example 13 | — | — | 8/1000 | — |
| Comp. Ex. 8 | — | — | 5/1000 | — |
| Example 14 | — | — | 7/1000 | — |
| Comp. Ex. 9 | — | — | 5/1000 | — |
| Example 15 | — | — | 17/1000 | — |
| Comp. Ex. 10 | — | — | 15/1000 | — |

What is claimed is:

1. An improved thermoplastic resin composition comprising the product obtained by subjecting a mixture of:
(A) 60 to 98 wt. % of at least one engineering plastic selected from the group consisting of a copolymer of polypropylene and an α,β-unsaturated carboxylic acid, an ABS resin, an AES resin, an AAS resin, a methacrylic resin, a polyamide resin, a thermoplastic polyamide elastomer, a thermoplastic polyurethane resin, a thermoplastic polyurethane elastomer, a polyacetal resin, a polyphenylene ether resin, a polycarbonate resin, a polyester resin, a thermoplastic polyester elastomer, a polysulfone resin, a polyether sulfone resin, a polyphenylene sulfide resin, a polyallylate resin, a polyether ketone resin, a polyether ether ketone resin and a polyamide imide resin; and (B) 2 to 40 wt. % of a rubber material containing an α,β- unsaturated carboxylic acid or a derivative thereof to dynamic heat treatment in the presence of 0.01 to 5 wt. %, based on the total weight of said components (A) and (B), of a carbon radical inducing agent.

2. The improved thermoplastic resin composition as claimed in claim 1, wherein said (B) rubber material containing an α, β-unsaturated carboxylic acid or a derivative thereof is at least one member selected from the group consisting of:

(B1) thermoplastic ethylene-propylene rubber,
(B2) thermoplastic butadiene rubber, and
(B3) thermoplastic isoprene rubber.

3. The improved thermoplastic resin composition as claimed in claim 1, wherein said carbon radical inducing agent contains a charge-transfer complex.

4. The improved thermoplastic resin composition as claimed in claim 1, wherein said carbon radical inducing agent contains a hydrogen donating compound.

5. The improved thermoplastic resin composition as claimed in claim 1, wherein said carbon radical inducing agent contains a dihydroquinoline derivative.

6. The improved thermoplastic resin composition as claimed in claim 3, wherein said charge-transfer complex contains a dihydroquinoline derivative and a bismaleimide compound.

7. A method for producing an improved thermoplastic resin composition comprising subjecting a mixture of:

(A) at least one engineering plastic selected from the group consisting of a copolymer of polypropylene and an α,β-unsaturated carboxylic acid, an ABS resin, an AES resin, an AAS resin, a methacrylic resin, a polyamide resin, a thermoplastic polyurethane resin, a thermoplastic polyurethane elastomer, a polyacetal resin, a polyphenylene ether resin, a polyphenylene ether resin containing polystyrene resin, a polycarbonate resin, a polyester resin, a thermoplastic polyester elastomer, a polysulfone resin, a polyether sulfone resin, a polyphenylene sulfide resin, a polyallylate resin, a polyether ketone resin, a polyether ether ketone resin and a polyamide imide resin; and (B) a rubber material containing an α,β-unsaturated carboxylic acid or a derivative thereof to dynamic heat treatment in the presence of a carbon radical inducing agent.

8. The method for producing an improved thermoplastic resin composition as claimed in claim 7, wherein said dynamic heat treatment is carried out a melt kneading temperature in the range of 150° to 350° C. and a heat treatment time in the range of 20 seconds to 20 minutes.

9. The method for producing an improved thermoplastic resin composition as claimed in claim 7, wherein said (B) rubber material containing an α,β-unsaturated carboxylic acid or a derivative thereof is at least one member selected from the group consisting of:

(B1) thermoplastic ethylene-propylene rubber,
(B2) thermoplastic butadiene rubber, and
(B3) thermoplastic isoprene rubber.

10. The method for producing an improved thermoplastic resin composition as claimed in claim 7, wherein said carbon radical inducing agent contains a charge-transfer complex.

11. The method for producing an improved thermoplastic resin composition as claimed in claim 7, wherein said carbon radical inducing agent contains a hydrogen donating compound.

12. The method for producing an improved thermoplastic resin composition as claimed in claim 7, wherein said carbon radical inducing agent contains a dihydroquinoline derivative.

13. The method for producing an improved thermoplastic resin composition as claimed in claim 10, wherein said charge-transfer complex contains a dihydroquinoline derivative and a bismaleimide compound.

14. The improved thermoplastic resin composition as claimed in claim 1 wherein said engineering plastic is selected from the group consisting of a polyamide resin, a thermoplastic polyamide elastomer, a polyoxymethylene resin, a polyphenylene ether resin, a polycarbonate resin, a polyester resin and a thermoplastic polyester elastomer.

15. The method for producing an improved thermoplastic resin composition as claimed in claim 7 wherein said engineering plastic is selected from the group consisting of a polyamide resin, a thermoplastic polyamide elastomer, a polyoxymethylene resin, a polyphenylene ether resin, a polycarbonate resin, a polyester resin and a thermoplastic polyester elastomer.

* * * * *